United States Patent Office 3,829,512
Patented Aug. 13, 1974

3,829,512
PROCESS FOR THE PREPARATION OF PENTAFLUORETHYL IODIDE AND HEPTAFLUORISOPROPYL IODIDE
Hans Millauer, Niederhochstadt, Taunus, Germany, assignor to Farbwerke Hoechst Aktiengesellschaft vormals Meister Lucius & Brüning, Frankfurt, Germany
No Drawing. Filed Aug. 8, 1972, Ser. No. 278,878
Claims priority, application Germany, Aug. 10, 1971,
P 21 39 964.4
Int. Cl. C07c 17/08, 19/08
U.S. Cl. 260—653.6                                        4 Claims

ABSTRACT OF THE DISCLOSURE

A process for the preparation of pentafluorethyl iodide and heptafluoroisopropyl iodide by reacting perfluorinated olefins of the formula $R_F$—CF=$CF_2$ wherein $R_F$ is fluorine or $CF_3$, with iodine and gaseous HF in the presence of antimony halides and sulfuryl chloride and/or chlorine.

The compounds are used as telogens for the telomerization of tetrafluorethylene to long-chain perfluoralkyl iodides.

---

The present invention relates to a process for the preparation of pentafluorethyl iodide and heptafluorisopropyl iodide by reaction of perfluorinated olefins with iodine and hydrogen fluoride in the presence of antimony halides and sulfuryl chloride and/or chlorine.

Different processes are known for the preparation of pentafluorethyl iodide and heptafluorisopropyl iodide, among which the decarboxylation of the silver salts of corresponding perfluoro-carboxylic acids in the presence of iodine in excess (silver salt method) is unfit for large-scale manufacture. There are furthermore known a series of processes, the principle of which consists in adding a hypothetical iodine monofluoride (IF) suggested as intermediate product resulting under the reaction conditions in tetrafluorethylene ($CF_2=CF_2$) or perfluoropropene ($CF_3CF=CF_2$).

Thus, for example, tetrafluorethylene may be reacted with a mixture of 1 mole of iodine pentafluoride ($IF_5$) and 2 moles of iodine to form $CF_3CF_2I$ (R. D. Chambers, W. K. R. Musgrave and J. Savory, Proceed. Chem. Soc. *1961*, 113; British Pat. No. 885,007; U.S. Pat. No. 3,132,185). According to French Pat. No. 1,482,092, tetrafluorethylene is reacted with a mixture of fluorine and iodine. H. J. Emeleus and R. N. Haszeldine (J. Chem. Soc. 1949, 2948), Dutch Patent Application No. 6612801 and U.S. Pat. No. 3,283,020 describe processes according to which in a two-step operation first tetrafluorodiiodethane is prepared from tetrafluorethylene and iodine and then it is converted to pentafluorethyl iodide by reaction with iodine pentafluoride.

All these processes have the disadvantage of requiring either iodine pentafluoride which has to be prepared from elementary fluorine, or elementary fluorine itself as reactant. Fluorine as well as iodine pentafluoride, however, are substances dangerous to handle on the one hand and very expensive on the other.

Further processes are known according to which either a mixture of tetrafluorethylene and iodine or the tetrafluoriodethane is reacted with a mild fluorination agent, for example sulfur tetrafluoride (U.S. Pat. No. 3,072,730), mercury difluoride (U.S. Pat. No. 3,133,125), lead tetrafluoride (Dutch Patent Application No. 6713608) or antimony trifluoride-dichloride (U.S. Pat. No. 3,351,671). According to U.S. Pat. No. 3,052,732, heptafluorisopropyl iodide is prepared by reaction of hexafluoropropylene, iodine and an alkali metal fluoride in an aprotic solvent. However, these cited processes are uneconomic when used for large-scale manufacture, because they either have too low conversion rates or yields or furnish numerous unusable by-products or require very expensive starting materials. Moreover, in some of the cited processes a considerable corrosion of the reaction vessels cannot be avoided since, by the formation of water in the course of the reaction, aqueous hydrofluoric acid having a highly corroding effect is formed.

A process has now been found for the preparation of pentafluorethyl iodide and heptafluorisopropyl iodide which comprises reacting perfluorinated olefins of the formula $$R_F\text{—}CF=CF_2 \tag{I}$$

where $R_F$ is fluorine or the $CF_3$ group, with iodine and hydrogen fluoride in the presence of antimony halides and sulfuryl chloride and/or chlorine, and isolating the products so obtained in known manner.

Instead of tetrafluorethylene, which is dangerous to handle, the adduct of tetrafluorethylene and iodine, i.e. tetrafluorodiiodethane is advantageously used as starting compound. Under the conditions of the invention process, tetrafluorodiiodethane is in a thermal equilibrium with tetrafluorethylene and iodine according to the following equation $$CF_2I\text{—}CF_2I \rightleftharpoons CF_2=CF_2+I_2 \tag{II}$$

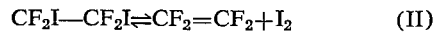

When tetrafluorodiiodethane is employed as starting compound, no additional elementary iodine is required.

Suitable antimony halides are for example antimony trifluoride ($SbF_3$), antimony trichloride ($SbCl_3$), antimony tribromide ($SbBr_3$), antimony triiodide ($SbI_3$), antimony pentafluoride ($SbF_5$), antimony pentachloride ($SbCl_5$), furthermore mixed antimony halides, for example antimony trifluoride-dichloride ($SbF_3Cl_2$) or antimony difluoride-trichloride ($SbF_2Cl_3$). Suitable antimony compounds are also those which under the reaction conditions of the process, are converted into one of the above halides by reaction with hydrogen fluoride, sulfuryl chloride, chlorine and/or iodine.

The proportion of the antimony compounds used may be from 1 to 50 mole percent, preferably from 1 to 45 mole percent, per mole of fluorolefin of formula I. It is possible to use more than 50 mole percent, but this results only in a very slight yield increase. Especially advantageous are proportions of from 5 to 20 mole percent of antimony compounds per mole of fluorolefin.

Sulfuryl chloride and/or chlorine are used in a proportion of at least 50 mole percent per mole of fluoroolefin. An excess of up to 20 mole percent or even more over the above quantity is advantageous, especially an excess proportion of from 5 to 15 mole percent. When a pentavalent antimony compound is employed, the proportion of sulfuryl chloride or chlorine may be decreased by about the quantity of this antimony compound used; but it has to be taken into consideration that the pentavalent antimony compound is converted into its trivalent state during the reaction. A mixture of sulfuryl chloride and chlorine may also be employed. The iodine is used in proportions of from 50 to 150 mole percent, preferably from 60 to 100 mole percent per mole of perfluoroolefin. When tetrafluorodiiodethane is used instead of tetrafluoroethylene, its proportion corresponds to an "iodine amount" of 100 mole percent. Iodine and chlorine may also be used, partially or totally, as iodine chloride ICl or $ICl_3$.

The proportion of hydrogen fluoride used is from 2 to 40 moles, preferably from 5 to 20 moles per mole of perfluoroolefin or tetrafluorodiiodethane. Large proportions of hydrogen fluoride have no negative effect, but they do not bring about any advantages either.

The reaction temperatures are above 50° C., generally from 50° to 180° C., preferably from 70° to 170° C.

For carrying out the process of the invention, the starting materials are for example introduced into a pressure resistant vessel, and the reaction mixture is heated with agitation to the reaction temperature. For the vessel, all pressure resistant materials resisting also to the corrosive action of hydrogen fluoride and the other reactants in a temperature range up to 200° C. are suitable, for example nickel and nickel alloys or steel and steel alloys, such as chromium-nickel-molybdenum steels.

Since the reaction is carried out in a closed vessel, a pressure establishes itself which depends substantially on the vapor pressure of hydrogen fluoride at the reaction temperature, on the gaseous reaction products, and on the reaction volume at hand. The pressure rate is not critical for the process of the invention; depending on the reaction conditions and temperatures, pressures of from 8 to about 100 atmospheres, generally from about 10 to about 60 atmospheres, develop. Under the cited advantageous conditions, the reaction is complete after a period of from ½ to 6 hours. The reaction vessel is then cooled and the perfluoroalkyl iodide which has formed is separated from the hydrogen fluoride by rectification or washing with water, and, if necessary, dried and further purified by fractionation. The excess hydrogen fluoride may be separated from the perfluoroalkyl iodide by distillation or by means of a separating funnel and reused for further reactions.

The process of the invention may also be carried out as follows: only one part—or only one component (for example hydrogen fluoride)—is introduced into the reaction vessel, and the remainder or the other components are added when the corresponding reaction temperature is reached. When chloride is used, it is advantageous to add it continuously or in portions in the course of the reaction. The process of the invention may also be carried out continuously.

Pentafluorethyl iodide and heptafluorisopropyl iodide prepared according to the present invention are used as telogens for the telomerization of tetrafluoroethylene to form long-chain perfluoro-alkyl iodides. The starting compounds may be easily prepared, and handling thereof does not require special care.

The following exampes illustrate the invention. Examples 1 to 3, 5 to 8, 11 to 13 and 15 to 18 show the advantages of the new process. The Comparative Examples 4, 9, 10, 14 and 19 show that unsatisfactory yields are obtained when antimony halides, chlorine and/or sulfuryl chloride are not used. The results of the tests are listed in Tables I and II. However, the process of the invention is not limited to the cited examples.

EXAMPLE 1

177 g. (0.05 mole) of tetrafluorodiiodethane $(CF_2I—CF_2I)$, 36 g. (0.265 mole) of sulfuryl chloride, 200 g. (10 moles) of hydrogen fluoride and 15 g. (0.05 mole) of antimony pentachloride $(SbCl_5)$ are introduced, at a temperature of from 0 to 5° C., in a 1 l. autoclave of corrosion-free steel provided with a magnetically operated double action agitator and an electric heating, heated to 165° C. within 1 hour with agitation and maintained at a temperature of from 165° to 168° C. for another 1.5 hours while continuing the agitation. Subsequently, the reaction mixture is allowed to cool to about 50° C., and the gaseous reaction products are slowly released from the autoclave. Unconverted iodine and antimony halides remain as residues. Towards the end of the degasing operation, the autoclave is again heated to about 100° C. The gaseous mixture containing substantially hydrogen chloride and $SO_2$ besides the desired pentafluorethyl iodide is passed successively, for further work-up, through a washing vessel containing 800 ml. of water, an empty (safety) vessel, a washing vessel containing 15% aqueous sodium hydroxide solution (washing vessels all made from plastics, connecting tubes made from lead or plastics), and finally through a drying tower containing granulated calcium chloride, before it is introduced into a cooling trap cooled to −78° C. After the gas has been totally released from the autoclave, the washing and drying vessels are flushed with a weak nitrogen current, and the flushing gas is then passed also through the cooling trap.

The amount of condensate collected in the cooling trap is 118 g. The condensate, according to analysis by gas chromatography, contains about 98% of pentafluorethyl iodide, which corresponds to a yield of about 94%.

EXAMPLE 2

In a reaction as described in Example 1 the reaction mixture is agitated for 3 hours instead of 1.5 hours at 165° to 168° C., and then worked up as indicated.

The contents of the cooling trap are 119 g. of condensate which contains about 98% of pentafluorethyl iodide corresponding to a yield of about 95%.

EXAMPLE 3

In a test as described in Example 1, 0.025 mole instead of 0.05 mole of $SbCl_5$ is used.

The pentafluorethyl iodide yield is 88%.

EXAMPLE 4 (COMPARATIVE EXAMPLE)

A test as described in Example 1 is run without adding antimony pentachloride. The reaction mixture is agitated, as indicated in Example 1, for 1.5 hours at 165° to 168° C., and worked up as described.

The pentafluorethyl iodide yield is only 63%.

EXAMPLE 5

In a test as described in Example 1, 0.05 mole of antimony trichloride is used instead of antimony pentachloride.

The pentafluorethyl iodide yield is 78%.

EXAMPLE 6

In a test as described in Example 1, 0.05 mole of antimony trichloride is used instead of antimony pentachloride, and the reaction mixture is agitated for 3 hours at 165° to 168° C. instead of 1.5 hours.

The pentafluorethyl iodide yield is 89%.

EXAMPLE 7

354 g. (1.0 mole) of tetrafluoro-1,2-diiodethane, 30 g. (0.10 mole) of antimony pentachloride and 200 g. (10 moles) of hydrogen fluoride are introduced into a test apparatus as described in Example 1. Subsequently, 40 g. (0.56 mole) of chlorine which before were weighed in a little steel cylinder, are condensed into the reaction autoclave, passing through a short steel capillary tube. The reaction mixture is heated, with agitation, to 140° C. within 1 hour and then maintained at 140° to 145° C. for 3 hours. Subsequently, the autoclave is allowed to cool to about 50° C., and the reaction mixture is worked up as in Example 1.

In the cooling trap 175 g. of condensate are obtained which contain about 75% of pentafluorethyl iodide. The yield thus is about 49%.

EXAMPLE 8

354 g. (1.0 mole) of tetrafluoro-1,2-diiodethane, 45 g. (0.63 mole) of chlorine and 200 g. (10 moles) of hydrogen fluoride are added to the residue remaining in the autoclave after the separation of the volatile reaction products of Example 7, and the whole is then heated to 140–145° C. for 3 hours. The subsequent procedure is as described in Example 7.

222 g. of 83% pentafluorethyl iodide are obtained, which correspond to a yield of 75%.

EXAMPLE 9 (COMPARATIVE EXAMPLE)

A test as described in Example 7 is carried out without addition of antimony pentachloride. The reaction mixture is agitated, as in Example 7, for 3 hours at 140–145° C. and then worked up as described.

The pentafluorethly iodide yield is only 34%.

TABLE I

| Number | Starting compounds (mole) | | | | Reaction cond. | | Yield relative to fluoro compound used |
| --- | --- | --- | --- | --- | --- | --- | --- |
| | Fluoro compound | $I^2$ Ox. | HF | Additives (mole) | Hrs. | °C. | |
| 1 | 0.50 $CF_2I-CF_2I$ | 0.27 $SO_2Cl_2$ | 10 | 0.05 $SbCl_5$ | 1.5 | 165–168 | 94% $CF_3-CF_2I$ |
| 2 | 0.50 $CF_2I-CF_2I$ | 0.27 $SO_2Cl_2$ | 10 | 0.05 $SbCl_5$ | 3 | 165–168 | 95% $CF_3-CF_2I$ |
| 3 | 0.50 $CF_2I-CF_2I$ | 0.27 $SO_2Cl_2$ | 10 | 0.025 $SbCl_5$ | 1.5 | 165–168 | 88% $CF_3-CF_2I$ |
| 4 | 0.50 $CF_2I-CF_2I$ | 0.27 $SO_2Cl_2$ | 10 | | 1.5 | 165–168 | 63% $CF_3-CF_2I$ |
| 5 | 0.50 $CF_2I-CF_2I$ | 0.27 $SO_2Cl_2$ | 10 | 0.05 $SbCl_3$ | 1.5 | 165–168 | 78% $CF_3-CF_2I$ |
| 6 | 0.50 $CF_2I-CF_2I$ | 0.27 $SO_2Cl_2$ | 10 | 0.05 $SbCl_3$ | 3 | 165–168 | 89% $CF_3-CF_2I$ |
| 7 | 1.0 $CF_2I-CF_2I$ | 0.56 $Cl_2$ | 10 | 0.10 $SbCl_5$ | 3 | 140–145 | 49% $CF_3-CF_2I$ |
| 8 | 1.0 $CF_2I-CF_2I$ | 0.63 $Cl_2$ | 10 | Residue from 7 | 3 | 140–145 | 75% $CF_3-CF_2I$ |
| 9 | 1.0 $CF_2I-CF_2I$ | 0.63 $Cl_2$ | 10 | | 13 | 140–145 | 34% $CF_3-CF_2I$ |

EXAMPLE 10 (COMPARATIVE EXAMPLE)

254 g. (1.0 mole) of iodine, 71 g. (0.53 mole) of sulfuryl chloride and 200 g. (10 moles) of hydrogen fluoride are introduced into a test apparatus as described in Example 1. Subsequently, 150 g. (1.0 mole) of perfluoropropene which before was weighed in a little steel cylinder, is condensed into the reaction autoclave via a short steel capillary tube. The mixture is heated to 170° C. with agitation, maintained at this temperature for 5 hours and then cooled to about 50° C. The volatile reaction products are passed successively through a washing vessel containing 800 ml. of water, an empty (safety) vessel, a washing vessel containing a 15% potassium hydroxide solution (washing vessel all made from plastics, connection tubes made from lead or plastics), then through a cooling trap having a temperature of 0° C., a drying tower containing granulated calcium chloride, and finally introduced into a trap cooled to −78° C. During the degasing operation, the temperature of the autoclave is raised to 100° C. Subsequently, the phases precipitated in the different washing vessels and traps are collected, dried and fraction-distilled.

130 g. of a low boiling fraction, having a boiling point of from −30° to −25° C., consisting substantially of unconverted perofluoropropene are obtained, and 25 g. of a fraction having a boiling point of from 35 to 43° C. which, according to gas chromatography analysis, contains about 90% of heptafluoro-isopropyl-iodide.

The yield is thus only about 10%.

EXAMPLE 11

In a reaction as described in Example 10, 160 g. (0.63 mole) instead of 254 g. (1.0 mole) of iodine, and additionally 30 g. (0.10 mole) of antimony pentachloride are used. 241 g. of a fraction having a boiling point of from 35° to 43° C. are obtained containing about 98% of heptafluorisopropyl iodide.

The yield is thus about 80%.

EXAMPLE 12

In a reaction as described in Example 11, instead of 71 g. (0.53 mole) of sulfuryl chloride, 40 g. (0.56 mole) of chlorine and, instead of 30 g. (0.1 mole) of antimony pentachloride, 60 g. (0.20 mole) of this substance are introduced into the reactor. The mixture is agitated for about 1 hour at 25° C., then 150 g. (1.0 mole) of perfluoropropene are introduced, and the whole is heated to 100° C. for 3 hours, to 120° C. for another hour and to 140° C. for a further hour. After the work-up described in Example 10, 260 g. of a fraction having a boiling point of from 35° to 43° are obtained which contains according to gas chromatography analysis about 98.5% of heptafluoroisopropyl iodide.

The yield is about 86%.

EXAMPLE 13

In a test as described in Example 12, the starting mixture is heated to 90 to 100° C. for 5 hours and worked up as described. The yield of heptafluorisopropyl iodide is 71%.

EXAMPLE 14: (COMPARATIVE EXAMPLE)

135 g. (0.9 mole) of perfluoropropene, 160 g. (0.63 mole) of iodine, 120 g. (0.40 mole) of antimony pentachloride and 200 g. (10 mole) of hydrogen fluoride are introduced into a test apparatus as described in Example 1. The mixture is then heated to 140 to 150° C. for 3 hours with agitation, and worked up as described in Example 10.

The yield of 97.8% pure heptafluorisopropyl iodide is 153 g., which correspond to 56%.

EXAMPLE 15

160 g. (0.63 mole) of iodine, 200 g. of HF and 40 g. (0.56 mole) of chlorine are added to the residue of Example 14 remaining in the autoclave after the separation of the volatile reaction products. Subsequently, 135 g. (0.9 mole) of perfluoropropene are introduced with agitation, and the mixture is heated to 140 to 150° C. for 3 hours.

The subsequent procedure is as described in Example 10, and 222 g. of 96.3% heptafluoisopropyl iodide are obtained, which correspond to a yield of 80%.

EXAMPLE 16

160 g. (0.63 mole) of iodine, 200 g. (10 moles) of hydrogen fluoride and 42 g. (0.59 mole) of chlorine are added to the residue of Example 15 remaining in the autoclave after the separation of the volatile reaction products. Subsequently, 150 g. (1.0 mole) of perfluoropropene are introduced with agitation, and the mixture is heated to 140 to 150° C. for 3 hours. The subsequent procedure is as described in Example 10, and 264 g. of 97.3% heptafluorisopropyl iodide are obtained, which correspond to a 86% yield.

EXAMPLE 17

160 g. (0.63 mole) of iodine, 200 g. (10 moles) of hydrogen fluoride and 45 g. (0.63 mole) of chlorine are added to the residue of Example 16 remaining in the autoclave after the separation of the volatile reaction products. Subsequently, 150 g. (1.0 mole) of perfluoropropene are introduced with agitation, and the mixture is heated for 3 hours to 120 to 130° C. The subsequent procedure is as described in Example 10, and 272 g. of 99% heptafluorisopropyl iodide are obtained, which correspond to a 91% yield.

EXAMPLE 18

160 g. (0.63 mole) of iodine, 100 g. (5 moles) of hydrogen fluoride and 45 g. (0.63 mole) of chlorine are added to the residue of Example 17 remaining in the autoclave after the separation of the volatile reaction products. Subsequently, 150 g. (1.0 mole) of perfluoropropene are introduced with agitation, and the mixture is heated for 3 hours to 120–130° C. The subsequent procedure is as described in Example 10, and 271 g. of 97.8% heptafluorisopropyl iodide are obtained, which correspond to a 90% yield.

EXAMPLE 19 (COMPARATIVE EXAMPLE)

160 g. (0.63 mole) of iodine, 200 g. (10 moles) of hydrogen fluoride and 45 g. (0.63 mole) of chlorine are introduced into a test apparatus as described in Example 1. Subsequently, 150 g. (1.0 mole) of perfluoropropene are introduced with agitation, and the mixture is heated to 120 to 130° C. for 3 hours. The work-up of the reaction mixture is carried out as described in Example 10.

The heptafluorisopropyl iodide yield is only 16%.

TABLE II

| Number | Starting compounds (mole) | | | | Reaction cond. | | Yield relative to fluoro compound used |
| --- | --- | --- | --- | --- | --- | --- | --- |
| | Fluoro compound | $I_2$ | Ox. | HF | Additives (mole) | Hrs. | °C. | |
| 10 | 1.0 $CF_3$—$CF$=$CF_2$ | 1.0 | 0.53 $SO_2Cl_2$ | 10 | | 5 | 170 | ca. 10% $CF_3$—$CFI$—$CF_3$ |
| 11 | 1.0 $CF_3$—$CF$=$CF_2$ | 0.63 | 0.53 $SO_2Cl_2$ | 10 | 0.10 $SbCl_3$ | 5 | 170 | 80% $CF_3$—$CFI$—$CF_3$ |
| 12 | 1.0 $CF_3$—$CF$=$CF_2$ | 0.63 | 0.56 $Cl_2$ | 10 | 0.20 $SbCl_5$ | 5 | 100-140 | 86% $CF_3$—$CFI$—$CF_3$ |
| 13 | 1.0 $CF_3$—$CF$=$CF_2$ | 0.63 | 0.56 $Cl_2$ | 10 | 0.20 $SbCl_5$ | 5 | 90-100 | 71% $CF_3$—$CFI$—$CF_3$ |
| 14 | 0.9 $CF_3$—$CF$=$CF_2$ | 0.63 | | 10 | 0.40 $SbCl_5$ | 3 | 140-150 | 56% $CF_3$—$CFI$—$CF_3$ |
| 15 | 0.9 $CF_3$—$CF$=$CF_2$ | 0.63 | 0.56 $Cl_2$ | 10 | Residue from 14 | 3 | 140-150 | 80% $CF_3$—$CFI$—$CF_3$ |
| 16 | 1.0 $CF_3$—$CF$=$CF_2$ | 0.63 | 0.59 $Cl_2$ | 10 | Residue from 15 | 3 | 140-150 | 86% $CF_3$—$CFI$—$CF_3$ |
| 17 | 1.0 $CF_3$—$CF$=$CF_2$ | 0.63 | 0.63 $Cl_2$ | 10 | Residue from 16 | 3 | 120-130 | 91% $CF_3$—$CFI$—$CF_2$ |
| 18 | 1.0 $CF_3$—$CF$=$CF_2$ | 0.63 | 0.63 $Cl_2$ | 5 | Residue from 17 | 3 | 120-130 | 90% $CF_3$—$CFI$—$CF_3$ |
| 19 | 1.0 $CF_3$—$CF$=$CF_2$ | 0.63 | 0.63 $Cl_2$ | 10 | | 3 | 120-130 | 16% $CF_3$—$CFI$—$CF_3$ |

What is claimed is:

1. A process for preparing pentafluoroethyl iodide or heptafluoroisopropyl iodide which comprises reacting a perfluorinated olefin of the formula $$R_F\text{—}CF=CF_2$$

in which $R_F$ is fluorine or $CF_3$ with from 0.5 to 1.5 moles of iodine and from 2 to 40 moles of hydrogen fluoride in a closed vessel at a temperature from 50° C. to 180° C. in the presence of from 0.01 to 0.5 moles of an antimony halide and of at least 0.5 moles of sulfuryl chloride, chlorine or a combination thereof, said molar proportions being per mole of perfluorinated olefin.

2. A process as claimed in Claim 1, wherein the reaction is carried out at a temperature of from 70° to 170° C.

3. The process defined in claim 1 wherein the proportion of antimony halide is from 0.01 to 0.45 moles per mole of perfluorinated olefin.

4. The process defined in claim 1 wherein the proportion of hydrogen fluoride is from 5 to 20 moles per mole of perfluorinated olefin.

References Cited

UNITED STATES PATENTS

| | | | |
| --- | --- | --- | --- |
| 2,554,857 | 5/1951 | Gochenour | 260—653 |
| 3,047,636 | 7/1962 | Hauptschein et al. | 260—653 |

DANIEL D. HORWITZ, Primary Examiner